(12) United States Patent
Doyen et al.

(10) Patent No.: US 10,096,213 B2
(45) Date of Patent: Oct. 9, 2018

(54) SIGNAL FOR CARRYING WASHOUT REQUEST IN HAPTIC AUDIOVISUAL CONTENT, RELATED METHOD AND DEVICE

(71) Applicant: THOMSON LICENSING, Issy les Moulineaux (FR)

(72) Inventors: Didier Doyen, La Bouexière (FR); Fabien Danieau, Rennes (FR); Philippe Guillotel, Vern sur Seiche (FR); Julien Fleureau, Rennes (FR)

(73) Assignee: THOMSON LICENSING, Issy-les-Moulineaux (FR)

( * ) Notice: Subject to any disclaimer, the term of this patent is extended or adjusted under 35 U.S.C. 154(b) by 116 days.

(21) Appl. No.: 15/212,253

(22) Filed: Jul. 17, 2016

(65) Prior Publication Data

US 2017/0024979 A1     Jan. 26, 2017

(30) Foreign Application Priority Data

Jul. 21, 2015 (EP) .................................... 15306184

(51) Int. Cl.
  *G08B 1/00*     (2006.01)
  *G08B 6/00*     (2006.01)
  (Continued)

(52) U.S. Cl.
  CPC .............. *G08B 6/00* (2013.01); *A63G 31/16* (2013.01); *A63J 25/00* (2013.01); *G06F 3/016* (2013.01)

(58) Field of Classification Search
  CPC . G08B 6/00; A63G 31/16; A63J 25/00; G06F 3/016
  (Continued)

(56) References Cited

U.S. PATENT DOCUMENTS 3,050,870 A      8/1962  Heilig
7,812,820 B2 *  10/2010  Schuler ................ G05B 19/108
                                                            345/156
(Continued)

FOREIGN PATENT DOCUMENTS

EP          2854120       4/2015
WO        97/25657 A1    7/1997
WO      WO2007047960    4/2006

OTHER PUBLICATIONS

Dasgupta et al., "The Stewart Platform Manipulator: A review", Mechanism and Machine Theory, vol. 35, Jan. 2000, pp. 15-40.
(Continued)

*Primary Examiner* — Daryl Pope
(74) *Attorney, Agent, or Firm* — Volpe and Koenig, P.C.

(57) ABSTRACT

A method, a device and a signal enabling automatic washouts in HAV contents. Washout related information is added to a signal representing a HAV content so that a HAV rendering device may adapt the washout to its physical limitations defined by the device capabilities as well as the user preferences. Different types of washouts are proposed. The HAV content signal comprises a first information representative of a haptic washout effect and an optional second information representative of the parameters required for the haptic washout effect. The method comprises performing a first haptic effect, computing the haptic washout effect according to device capabilities, user preferences, type of washout obtained from washout flags and optional washout parameters, and performing the haptic washout effect.

13 Claims, 8 Drawing Sheets

(51) Int. Cl.
*A63J 25/00* (2009.01)
*A63G 31/16* (2006.01)
*G06F 3/01* (2006.01)

(58) Field of Classification Search
USPC .................................................. 340/407.1
See application file for complete search history.

(56) References Cited

U.S. PATENT DOCUMENTS

2006/0253001 A1 11/2006 Small et al.
2012/0029703 A1 2/2012 Veltena

OTHER PUBLICATIONS

Anonymous, "ISO/IEC JTC 1/SC 29 N, ISO/IEC CD 23005-1: Information technology—Media context and control—Part 1: Architecture", International Organization for Standardization/ International Electrotechnical Commission, Jan. 7, 2014, pp. 1-63.
Anonymous, "International Standard ISO/IEC 23005-2: Information technology—Media context and control—Part 2: Control information", International Organization for Standardization/ International Electrotechnical Commission, Apr. 1, 2013, pp. 1-214.
Anonymous, "International Standard ISO/IEC 23005-3: Information technology—Media context and control—Part 3: Sensory information", International Organization for Standardization/ International Electrotechnical Commission, Nov. 1, 2013, pp. 1-116.
Anonymous, "International Standard ISO/IEC 23005-4: Information technology—Media context and control—Part 4: Virtual world object characteristics", International Organization for Standardization/ International Electrotechnical Commission, Apr. 1, 2013, pp. 1-278.
Anonymous, "International Standard ISO/IEC 23005-5: Information technology—Media context and control—Part 5: Data formats for interaction devices", International Organization for Standardization/ International Electrotechnical Commission, Jun. 1, 2013, pp. 1-312.
Anonymous, "International Standard ISO/IEC 23005-6: Information technology—Media context and control—Part 6: Common types and tools", International Organization for Standardization/ International Electrotechnical Commission, Nov. 1, 2013, pp. 1-140.
Nehaoua et al., "Classic and Adaptive Washout Comparison for a Low Cost Driving Simulator", 2005 IEEE International Symposium on Intelligent Control and 13th Mediterranean Conference on Control and Automation, Limassol, Cyprus, Jun. 27, 2005, pp. 586-591.
Hwang et al., "Adaptive Motion Washout Filter Design by Using Self-Tuning Fuzzy Control", IEEE/ASME International Conference on Advanced Intelligent Mechatronics, Singapore, Singapore, Jul. 14, 2009, pp. 811-815.
Kim et al., "Application of Vehicle Driving simulator Using New Washout Algorithm and Robust Control", SICE-ICASE International Joint Conference, Bexco, Busan, Korea, Oct. 18, 2006, pp. 2121-2126.
Huang, "Adaptive Washout Filter Design with Human Visual-Vestibular Based (HVVB) for VR-based Motion Simulator", 2010 International Joint Conference on Neural Networks, Barcelona, Spain, Jul. 18, 2010, pp. 1-6.
Harris et al., "Simulating Self-Motion I: Cues for the Perception of Motion", Virtual Reality, vol. 6, 2002, pp. 75-85.
Danieau et al., "Enhancing Audiovisual Experience with Haptic Feedback: A Survey on HAV", IEEE transactions on Haptics, vol. 6, No. 2, Apr. 2013, pp. 193-205.
Reiner, "The Role of Haptics in Immersive Telecommunication Environments", IEEE Transactions on Circuits and Systems for Video Technology, vol. 14, No. 3, Mar. 2004, pp. 392-401.
Waltl et al., "Sensory Effects for Ambient Experiences in the World Wide Web", Institute of Information Technology Alpen-Adria-University Klagenfurt, Technical Report No. TR/ITEC/11/1.13, Jul. 2011, pp. 1-12.
Song et al., "Washout Algorithm with Fuzzy-Based Tuning for a Motion Simulator", KSME International Journal, vol. 17, No. 2, Feb. 2003, pp. 221-229.
Anonymous, "International Standard ISO/IEC 14496-11: Information technology—Coding of audio-visual objects—Part 11: Scene description and application engine", Dec. 15, 2005, pp. 1-524.
El Saddik et al., "Haptic Technologies—Bringing Touch to Multimedia", Springer-Verlag, Berlin, 2011, pp. 1-230.
Choi et al., "Sensory Effects Metadata for RoSE Framework", International Organisation for Standardisation, ISO/IEC JTC1/SC29/ WG11, MPEG2008/M15560, Hannover, Germany, Jul. 21, 2008, pp. 1-42.

* cited by examiner

```
<!-- ############################################## -->
<!-- SEM Base Attributes                            -->
<!-- ############################################## -->
<sedl:Effect xsi:type="sev:RigidBodyMotionType"
             duration="2" si:pts="0" washout="WASHOUT_BBOX">
  <sev:MoveToward directionV="0" directionH="0" distance= "0.04"/>
  <sem:WashoutParameters duration="8" minValue= "0.01" maxValue="0.03"/>
</sedl:Effect>
```

| SEMBaseAttributes{ | Nb bits |
|---|---|
| activateFlag | 1 |
| durationFlag | 1 |
| fadeFlag | 1 |
| altFlag | 1 |
| priorityFlag | 1 |
| locationFlag | 1 |
| washoutFlags | 3 |

Figure 5A

```
<!-- ############################################## -->
<!-- SEM Base Attributes                            -->
<!-- ############################################## -->
<attributeGroup name="SEMBaseAttributes">
  <attribute name="activate" type="boolean" use="optional" />
  <attribute name="duration" type="positiveInteger" use="optional" />
  <attribute name="fade" type="positiveInteger" use="optional" />
  <attribute name="alt" type="anyURI" use="optional" />
  <attribute name="priority" type="positiveInteger" use="optional" />
  <attribute name="location" type="mpeg7:termReferenceType" use="optional"/>
  <attribute name="washout" type="washoutType" use="optional"/>
  <attributeGroup ref="sedl:SEMAdaptabilityAttributes"/>
</attributeGroup>
```

| WashoutFlags | Type of Washout |
|---|---|
| 0xx | NO_WASHOUT |
| 100 | WASHOUT_DEFAULT |
| 101 | WASHOUT_ABSOLUTE |
| 110 | WASHOUT_NEXT |
| 111 | WASHOUT_BBOX |

Figure 5C

```
<simpleType name=" washoutType ">
 <restriction base="NMTOKEN">
  <enumeration value="NO_WASHOUT"/>
  <enumeration value="WASHOUT_DEFAULT"/>
  <enumeration value="WASHOUT_ABSOLUTE"/>
  <enumeration value="WASHOUT_NEXT"/>
  <enumeration value="WASHOUT_BBOX"/>
 </restriction>
</simpleType>
```

| RigidBodyMotionCapabilityType { | Nb bits |
|---|---|
| MoveTowardCapabilityFlag | 1 |
| MoveToDefaultCapabilityFlag | 1 |

710

| MoveToDefaultCapabilityType { | Nb bits |
|---|---|
| DefaultXPositionFlag | 1 |
| DefaultYPositionFlag | 1 |
| DefaultZPositionFlag | 1 |
| If (DefaultXPositionFlag) {<br>    DefaultXPosition | 32 |
| If (DefaultYPositionFlag) {<br>    DefaultYPosition | 32 |
| If (DefaultZPositionFlag) {<br>    DefaultZPosition | 32 |

SIGNAL FOR CARRYING WASHOUT REQUEST IN HAPTIC AUDIOVISUAL CONTENT, RELATED METHOD AND DEVICE

This application claims the benefit, under 35 U.S.C. § 119 of European Patent Application No. 15306184.1, filed Jul. 21, 2015.

TECHNICAL FIELD

The invention relates to the domain of haptic audiovisual content and more precisely a haptic audiovisual signal comprising a washout flag, as well as a method and a device for rendering the said content. The invention may for example be implemented in automobile or aircraft simulators, video games, theme park attractions, auditoriums, movie theaters, but also at home using consumer-level haptic audiovisual rendering devices.

BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In U.S. Pat. No. 3,050,870, Heilig introduced Sensorama, a mechanical device where users could watch a movie, sense vibrations, feel the wind and smell odors. This pioneering work dating from the sixties opened the path towards the addition of haptics to improve the immersion of a user in virtual reality environments. Motion simulation is one haptic effect and is for example used in professional flight simulators but also amusement parks for enhancing video viewing experience with haptic effects of motion. Most of these systems are using a variation of Stewart's platform described by Dasgupta in "The Stewart platform manipulator: a review", Basically, a motion simulator can simply be understood as a seat attached on a platform able to move in any direction and is hereafter called a haptic device. Therefore, the user's whole body is moved to generate various sensations such as accelerating, falling or passing over bumps. Such motion simulators have an effect on the vestibular system of the user that allows a human user to sense acceleration and rotation of his body and therefore to feel its movement.

When applied to audiovisual content, haptic feedback may be used to improve the immersion of the viewer into the content. This combination is known under the acronym HAV, standing for Haptics Audio Visual. In HAV systems, the relation between users and content is no more limited to a passive context where the user just listens to the sounds and watches the images but is enhanced through physical actions on the user's body that induce physical sensations in relation with the audiovisual content. As a result the experience's emotional impact is magnified. For that purpose, the signal representing the audiovisual content needs to be enhanced with information about the haptic effects to be performed. This is done by first generating the appropriate haptic effect information and then combining it with the audiovisual data, thus creating a HAV content to be rendered by a HAV rendering device. When creating the haptic data, the creator of haptic data has to specify the type and parameters of the effects. There some situations where the creator knows the capabilities of the HAV rendering device, as is the case in closed systems such as those used in amusement parks or so-called 4D movie theaters. In this context, the creator adapts the effects to these capabilities. In the case of home users' haptic rendering devices, the situation is different since there is a huge diversity of rendering capabilities. Typical example is the range of movement for a motion platform or haptic device. Cheap motion platforms may have a more limited range than more expensive devices. In order to render correctly the desired haptic effect, the creator needs to adapt the haptic rendering information to each rendering device and therefore may provide multiple versions of the HAV content.

Creating, distributing and rendering haptic feedback means that a representation format is required. Besides proprietary formats, MPEG-V architecture is one standard formalization of the workflow for HAV content. MPEG-V standard (MPEG-V. 2011 ISO/IEC 23005),) is specifically designed to provide multi-sensorial content associated with audiovisual data, in order to control multimedia presentations and applications by using advanced interaction devices such as HAV rendering devices. MPEG-V particularly describes "sensory effects" which includes haptic effects.

In the domain of haptic rendering, a major issue is related to the physical limitations associated with the rendering devices. Indeed, for a rendering device supposed to provide heat sensation to the user, for example to be associated with an explosion in an action movie, there is some inertia to deliver the heat and then to cool again. As a consequence, in some cases it is not possible to combine the succession of some haptic effects. In the case of a haptic device, when two "forward acceleration" effects need to be rendered, the haptic device may not have enough movement range to combine the two required movements. To overcome this issue, the haptic device will first move forward to deliver the acceleration feeling, then it will have to go back to its original position before moving forward again to deliver the second acceleration. This intermediary step of moving back to the original position between two effects is called "washout" and should not be perceived by the user. In order to be unnoticed by the user, the acceleration of the movement must be smaller than the threshold of the vestibular system which is around $0.1\ m/s^2$. A major issue about washouts is that, due to the diversity of HAV rendering devices and their different physical limitations, it is very difficult for creators of HAV contents to make use of washouts since they are strongly related to the physical limitations and capabilities of the rendering devices. In the general case, these limitations are unknown at the creation stage.

It can therefore be appreciated that there is a need for a solution that addresses at least some of the problems of the prior art. The present disclosure provides such a solution.

SUMMARY

The present disclosure is about a method, a device and a signal enabling automatic washouts in HAV contents. More precisely, washout related information is added to a signal representing a HAV content so that a HAV rendering device may adapt the washout regarding its physical limitations as well as the user preferences. Different types of washouts are proposed, comprising WASHOUT_DEFAULT where the device returns to its default zero value as specified partly by the device parameters, WASHOUT_ABSOLUTE where the device returns to an absolute position provided by the content creator, WASHOUT_BBOX where the device returns to a value within a range of absolute values and WASHOUT_NEXT where the next movement is provided. WASHOUT_ABSOLUTE is under control of the content creator that knows the characteristics of major haptic rendering devices and tries to overcome the devices' limitations while WASHOUT_BBOX and WASHOUT_NEXT provide more freedom to the rendering devices, allowing them to run some prediction algorithms to optimize the rendering of successive effects.

In a first aspect, the disclosure is directed to a method for rendering a haptic effect implemented in a haptic rendering device, comprising obtaining a signal comprising information representative of the haptic effect to be rendered, the information carrying at least a first information representative of a haptic washout effect to be performed after the haptic effect, providing a haptic command representative of the haptic effect to the haptic actuator to perform a first effect, computing the haptic command representative of the haptic washout effect, according to device capabilities and providing a further haptic command representative of the haptic effect to the haptic actuator to perform the haptic washout effect. In a variant embodiment, computing the haptic command is performed according to user preferences.

Various embodiments of first aspect comprise:
- a haptic washout wherein the value of first information corresponds to a determined value representative of a haptic washout effect with absolute positioning, further comprising a second information representative of the parameters required for the haptic washout effect to be performed after the haptic effect and where this second information comprises an absolute value to be reached by the washout operation;
- a haptic washout wherein the value of first information corresponds to a determined value representative of a haptic washout effect with next effect information, further comprising a second information representative of the parameters required for the haptic washout effect and where this second information comprises information representative of the next effect to be performed;
- a haptic washout wherein the value of first information corresponds to a determined value representative of a haptic washout effect with range positioning, further comprising a second information representative of the parameters required for the washout effect and where this second information comprises a minimal position value and a maximal position value defining a range of position values, any one of which should be respected by the haptic washout operation.

In a second aspect, the disclosure is directed to a data processing apparatus for rendering a haptic effect comprising an input interface configured to obtain a signal comprising information representative of an haptic effect to be rendered characterized in that it carries at least a first information representative of a haptic washout effect to be performed after the haptic effect, a haptic interface configured to provide a first haptic command to the haptic actuator to perform first haptic effect, obtain device capabilities from the haptic actuator and provide a second haptic command to the haptic actuator to perform the haptic washout effect, a memory configured to provide at least the haptic user preferences and a processor configured to compute the haptic washout effect, according to at least one of the device capabilities and user preferences.

Various embodiments of second aspect comprise:
- a haptic washout wherein the processor is further configured to detect that the value of first information corresponds to a determined value representative of a haptic washout effect with absolute positioning and in this case obtains from the signal a second information representative of the parameters required for the haptic washout effect to be performed and where this information comprises an absolute value to be reached by the washout operation, and computes the haptic washout effect, according to the absolute value to be reached and at least one of the device capabilities and user preferences;
- a haptic washout wherein the processor is further configured to detect that the value of first information corresponds to a determined value representative of a haptic washout effect with information representative of the next effect to be performed and in this case obtains from the signal a second information representative of the parameters required for the haptic washout effect to be performed and where this information comprises information representative of the next effect to be performed and computes the haptic washout effect, according to the information representative of the next effect and at least one of the device capabilities and user preferences.
- a haptic washout wherein the processor is further configured to detect that the value of first information corresponds to a determined value representative of a haptic washout effect with range positioning and in this case obtains from the signal a second information representative of the parameters required for the haptic washout effect to be performed and where this information comprises a minimal position value and a maximal position value defining a range of position values, any one of which should be respected by the haptic washout effect and computes the haptic washout effect, according to the range of position values and at least one of the device capabilities and user preferences;
- receiving the signal comprising information representative of an haptic effect to be rendered from a sending device through a communication network;
- obtaining the signal comprising information representative of an haptic effect to be rendered from a media storage element.

In a third aspect, the disclosure is directed to a signal carrying a haptic effect comprising at least a first information representative of a haptic washout effect to be performed after the haptic effect. In a variant embodiment, the signal carrying a haptic effect comprises at least a second information representative of the parameters required for the washout effect and where this second information comprises one of an absolute value to be reached by the washout effect, information representative of the next effect to be performed and a range of position values defined by a minimal position value and a maximal position value.

In a fourth aspect, the disclosure is directed to a computer program comprising program code instructions executable by a processor for implementing any embodiment of the method of the first aspect.

In a fifth aspect, the disclosure is directed to a computer program product which is stored on a non-transitory computer readable medium and comprises program code instructions executable by a processor for implementing any embodiment of the method of the first aspect.

BRIEF DESCRIPTION OF DRAWINGS

Preferred features of the present disclosure will now be described, by way of non-limiting example, with reference to the accompanying drawings, in which.

DESCRIPTION OF EMBODIMENTS

The invention will be described in reference to a particular embodiment of a method for enabling automatic washouts in HAV contents, implemented in a haptic device. The haptic effect considered for the description is the movement and for the sake of simplicity is limited in the description to one-dimensional translations except for where expressly stated. To setup the vocabulary, it is considered in this disclosure that the "command" is the low-level information provided to the actuator in order to realize an "effect" defined in the content by the content creator.

Figure 1:
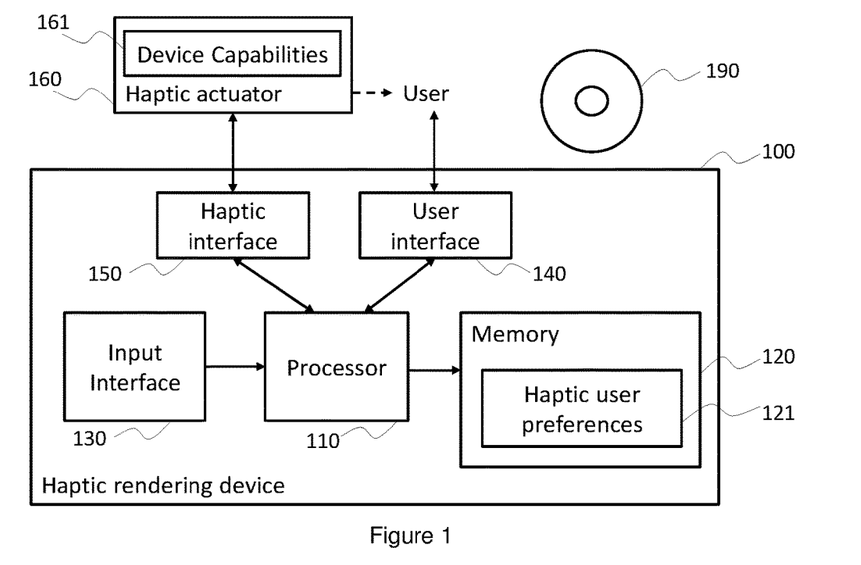
FIG. 1 illustrates an exemplary system in which the solution of the disclosure may be implemented.

FIG. 1 illustrates an exemplary apparatus in which the disclosure may be implemented. The haptic rendering device 100 preferably comprises at least one hardware processor 110 configured to execute the method of at least one embodiment of the present disclosure, memory 120 storing at least haptic user preferences 121, an input interface 130 configured to obtain an HAV content, a user interface 140 configured to interact with a user, a haptic interface 150 configured to interact with at least one haptic actuator 160, this actuator being configured to provide physical stimulations towards the user's body. The device capabilities 161 include both device limitations such as a maximal movement range and default values such as a default neutral position. Haptic seats or force-feedback devices constitute examples of haptic actuators. Many other devices may be used, consistent with the spirit of the disclosure. Conventional communication interfaces compatible with WiFi or Ethernet protocols constitute examples of input interface 130. Other input interfaces may be used, consistent with the spirit of the disclosure. These input interfaces may provide support for higher level protocols such as various Internet protocols or data exchange protocols in order to allow the device 100 to interact with other devices. The non-transitory computer readable storage medium 190 stores computer readable program code that is executable by the processor 110. The skilled person will appreciate that the illustrated device is very simplified for reasons of clarity. The communication between the haptic interface 150 and haptic actuator 160 is preferably compatible with ISO/IEC 23005-5 whereas the haptic effects defined in the HAV content obtained through the input interface 130 are preferably defined in ISO/IEC 23005-3. It will be appreciated that the haptic actuator 160 is either a standalone device or is integrated to the haptic rendering device 100.

Figure 2A:
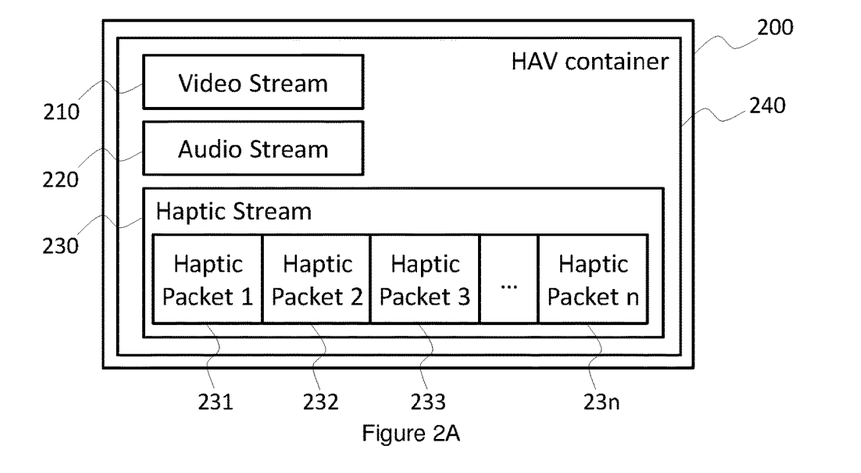
FIG. 2A shows a HAV bitstream, according to a particular and non-limitative embodiment of the present principles.

FIG. 2A shows a HAV bitstream, according to a particular and non-limitative embodiment of the present principles. The HAV bitstream 200 is a representation of HAV content adapted for storage and distribution purposes. It comprises for example a video stream 210, an audio stream 220 and a haptic stream 230. The format of the video stream 210 may be for example MPEG-2, H.264 or MPEG-4, the format of the audio stream 220 may be for example MP3 or AAC (Advanced Audio Coding). The haptic stream 230 comprises one or more haptic packets 231 to 23n, a haptic packet being a packet comprising data representative of a haptic effect, n being an integer greater than or equal to 1. The streams 210 to 230 are for example wrapped in a container 240, such as the well-known MPEG-2 Transport Stream or Real-time Transport Protocol (RTP). One skilled in the art can appreciate that the present principles are compatible with other types of formats and containers.

Figure 2B:
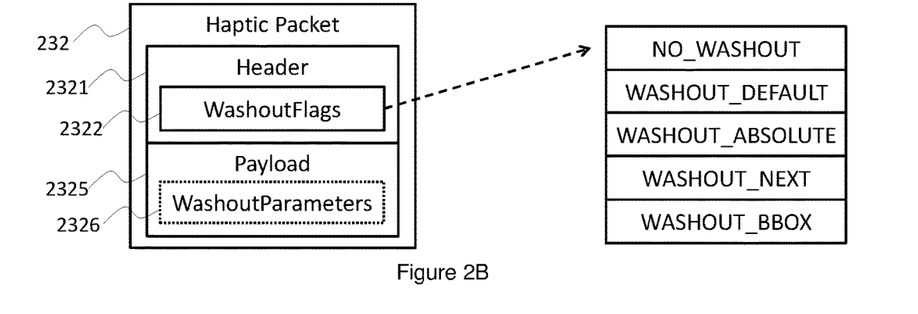
FIG. 2B details the structure of the haptic packets of the HAV bitstream introduced in FIG. 2A.

FIG. 2B details the structure of the haptic packets of the HAV bitstream introduced in FIG. 2A. Similarly to conventional bit stream encoding, the haptic packet 232 preferably comprises a header 2321 and a payload 2325. The header 2321 preferably comprises a first information 2322 "WashoutFlags" representative of a washout effect while the payload 2325 preferably comprises an optional second information 2326 "WashoutParameters" representative of the parameters required for the washout. The WashoutFlags 2322 define five different possibilities: NO_WASHOUT indicates that no washout should be done, WASHOUT_DEFAULT indicates that a washout should be done partly according to the default parameter values specified for the haptic rendering device, WASHOUT_ABSOLUTE indicates that a washout should be done according to an absolute value defined in the WashoutParameters 2326, WASHOUT_NEXT indicates that a washout should be done to anticipate the next move defined in the WashoutParameters 2326 and WASHOUT_BBOX indicates that a washout should be done according to minimal and maximal values defined in the WashoutParameters 2326. The precise definition of the washout parameters is related to the type of effect. Indeed, specifying an absolute value for a 3D position or a temperature is very different.

Both the header 2321 and the payload 2325 may also comprise other data related to haptics but not related to the present disclosure such as other haptic flags, commands or parameters.

According to a preferred embodiment, the first information is comprised in the header and the second information is comprised in the payload, as illustrated in FIG. 2B. According to variant embodiments, both the first information and second information are either comprised in the header or in the payload.

Figure 3A:
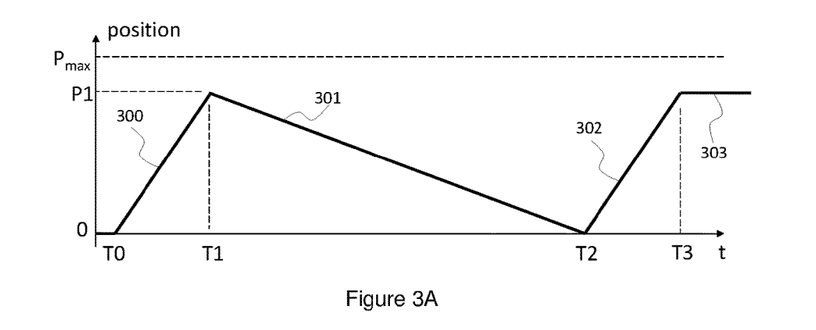
FIG. 3A illustrates the haptic effect induced by the displacement of a haptic device, according to a first example of the preferred embodiment, where a washout flag is positioned to "WASHOUT_DEFAULT"

FIG. 3A illustrates the haptic effect induced by the displacement of a haptic device, according to a first example of the preferred embodiment, where a washout flag is positioned to "WASHOUT_DEFAULT". The figure details the movements performed by the haptic device which corresponds to one example of haptic rendering device 100 as described in FIG. 1. At T0, a first haptic effect is obtained including the "WASHOUT_DEFAULT" flag. The effect is a forward movement effect. According to this effect, the first phase between T0 and T1 corresponds to a first translation effect, illustrated by line 300, which is a forward movement of length P1. The same effect is planned to be reiterated between T2 and T3, typically several seconds later. The creator requests the haptic device to return to its original position in order to have enough movement range for this second effect. Indeed, in this example $P1+P1>P_{max}$, with $P_{max}$ being the maximal value for the position of the haptic device, as defined in the capabilities 161. Since the "WASHOUT_DEFAULT" flag is positioned in the first effect, the haptic device returns to the default position at the end of the first effect, illustrated by line 301, i.e. 0 in this case. The values of default position are provided by the haptic actuator. This translation is performed at low speed with an acceleration that is lower than the threshold of the vestibular system so that the movement will not be noticed by the viewer. The delay available to perform the washout is provided by the washout parameters (here $\Delta_{T1T2}=T2-T1$). At T2, the haptic device is again at his original position, and receives the second forward effect. In this case, the washout flag was not set. Therefore the haptic device applies the effect, illustrated by line 302, but does not move back at the end of the effect and stays at the same position P1, illustrated by line 303. Example of values are 200 ms for the movement effect duration ($\Delta_{T0T1}=T1-T0$ and $\Delta_{T2T3}=T3-T2$), 3 seconds for the washout effect duration ($\Delta_{T1T2}=T2-T1$) and 5 cm for the amplitude of movement (P1). In the example depicted in the FIG. 3A, the washout movement depicted corresponds to a movement with constant speed, so 5 cm in 3 seconds. In practice, a non-constant and progressive acceleration is preferred to cope with physical limitations of the haptic device, while respecting the threshold of the vestibular system.

Figure 3B:
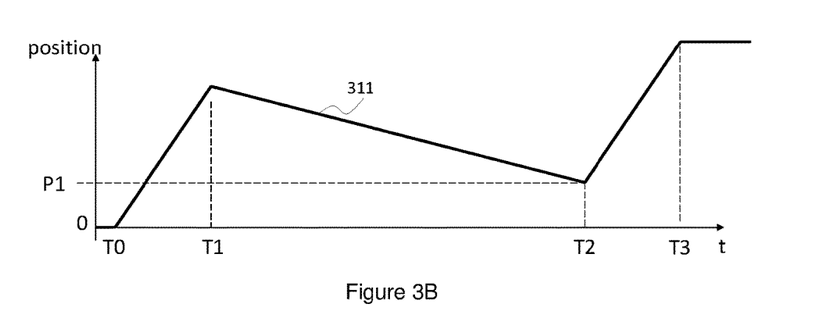
FIG. 3B illustrates the haptic effect induced by the displacement of a haptic device, according to a first example of the preferred embodiment, where a washout flag is positioned to "WASHOUT_ABSOLUTE"

FIG. 3B illustrates the haptic effect induced by the displacement of a haptic device, according to a second example of the preferred embodiment, where the washout flag is positioned to "WASHOUT_ABSOLUTE". In this case, the washout parameters comprises the value to reach, in this example fixed to P1, as well as the duration of the washout. In result to this effect, the position at t=T2, at the end of the washout, is P1, as illustrated by line 311.

Figure 3C:
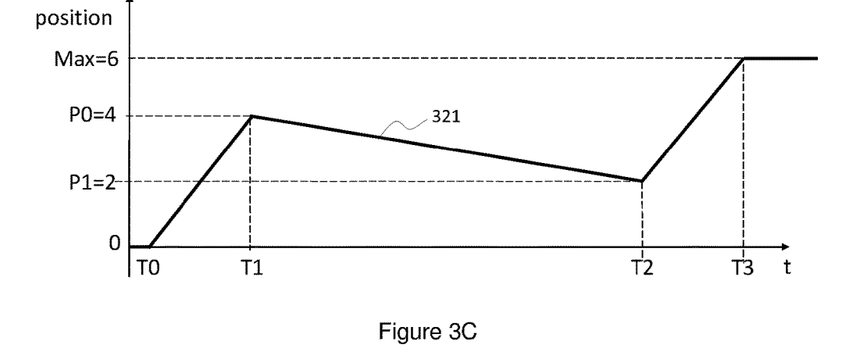
FIG. 3C illustrates the haptic effect induced by the displacement of a haptic device, according to a first example of the preferred embodiment, where a washout flag is positioned to "WASHOUT_NEXT"

FIG. 3C illustrates the haptic effect induced by the displacement of a haptic device, according to a third example of the preferred embodiment, where the washout flag is positioned to "WASHOUT_NEXT". In this case, the washout parameters comprises the movement of the next effect to be performed allowing the device to ensure this range will be sufficient according to its capabilities. For that, the device determines the position to be reached during the washout, based on its current position, the range of the next effect, and the device capabilities. In this example, the next effect parameter is fixed to "+4". The position at the end of the previous effect being "4" and the maximal position of the device being "6", it needs to position at most at P1=2, as illustrated by line 321.

Figure 3D:
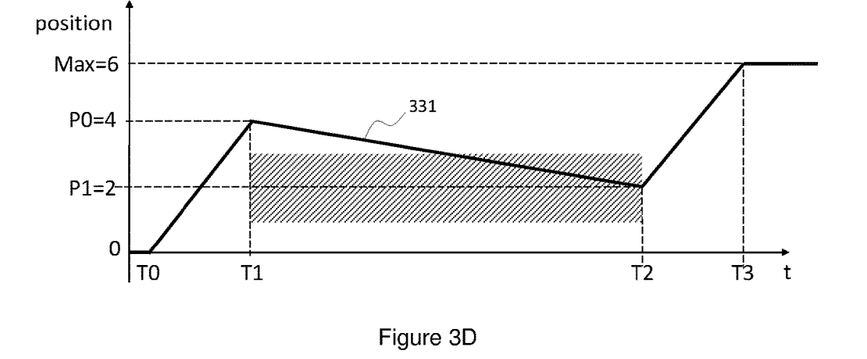
FIG. 3D illustrates the haptic effect induced by the displacement of a haptic device, according to a first example of the preferred embodiment, where a washout flag is positioned to "WASHOUT_BBOX"

FIG. 3D illustrates the haptic effect induced by the displacement of a haptic device, according to a fourth example of the preferred embodiment, where the washout flag is positioned to "WASHOUT_BBOX". In this case, the washout parameters comprises a range of position values that should be respected by the device, the range being defined by a minimal position value and a maximal position value. In this example, the parameters of the range of position values are fixed to "1" for minimal value and "3" for maximal value. In this case, the device decided to position the seat at position "2", as illustrated by line 331.

Figure 3E:
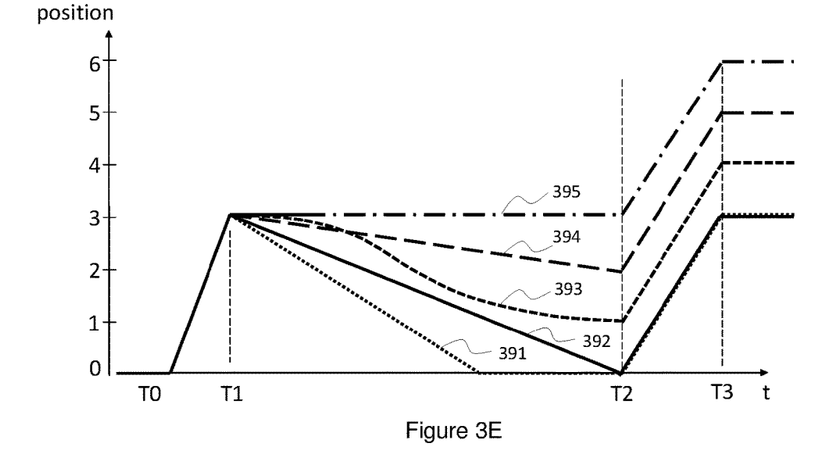
FIG. 3E illustrates different results of a same washout effect on different implementations of haptic devices.

FIG. 3E illustrates different results of a same washout effect on different implementations of haptic devices. These examples show the freedom enabled the HAV rendering device through the use of the "WASHOUT_NEXT" and "WASHOUT_BBOX" flags. In this example, the first effect, from T0 to T1, moves the haptic device forward by a quantity of "3" with a washout flag positioned to "WASHOUT_NEXT" and a washout parameter giving the forward value of "+3". From T2 to T3, a second effect, identical to the first one, moves forward again of a quantity of "3". According to a first implementation, as represented by the dotted line 391, the speed of this reverse movement is slightly lower than the perception level of the vestibular system and stops when the arrives at "0". In a second implementation, represented by the solid line 392, the speed of this reverse movement is calculated to reach the "0" position just before the next effect, while still being lower than the perception level of the vestibular system. A third implementation, represented by the small-dashed line 393; introduces some acceleration to smoothen the experience, while staying under the perception level of the vestibular system. In the fourth implementation, the range of the device is limited to "5" and the device is configured to minimize the movement. Therefore it decides to perform a washout to return at position "2" to be able to perform fully the next effect. This case is represented by the dashed line 394. Finally, the dashed line 395 represents a device that has a higher range of movement and therefore does not need to perform a washout to be able to render fully the second effect.

Figure 4A:
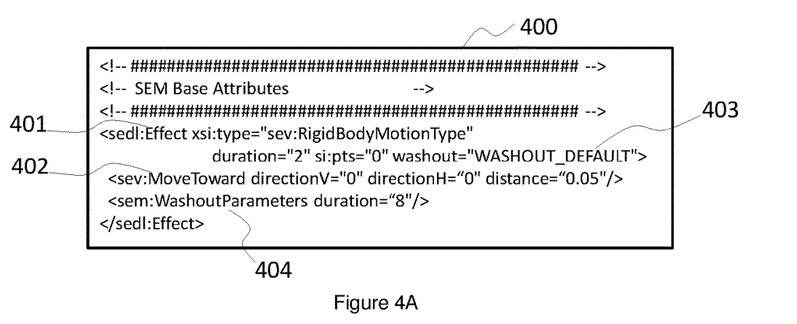
FIGS. 4A-4D illustrate the definition of the effects as signalled according to the preferred embodiment in the HAV packets in xml format corresponding to an example of implementation based on the MPEG-V standard and resulting respectively to the movements illustrated in FIGS. 3A, 3B, 3C and 3D.
Figure 4B:
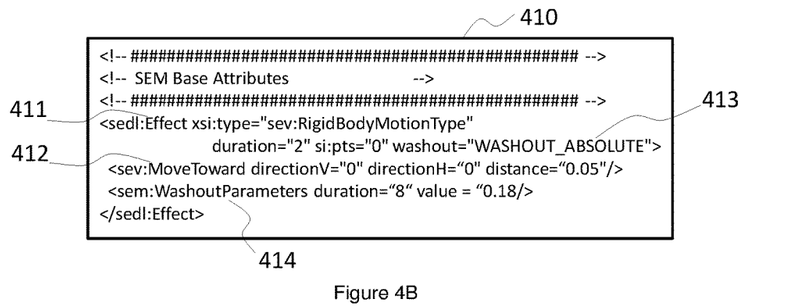
Figure 4C:
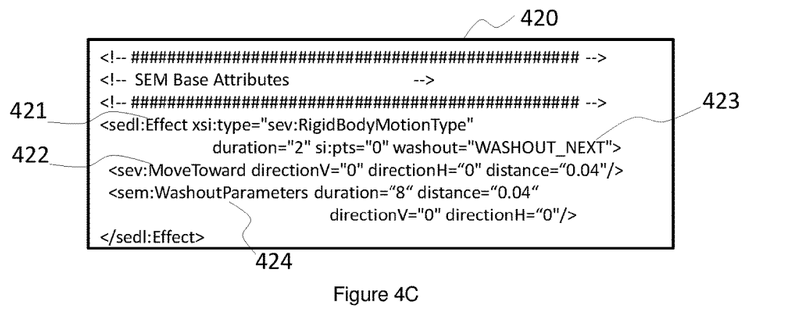
Figure 4D:
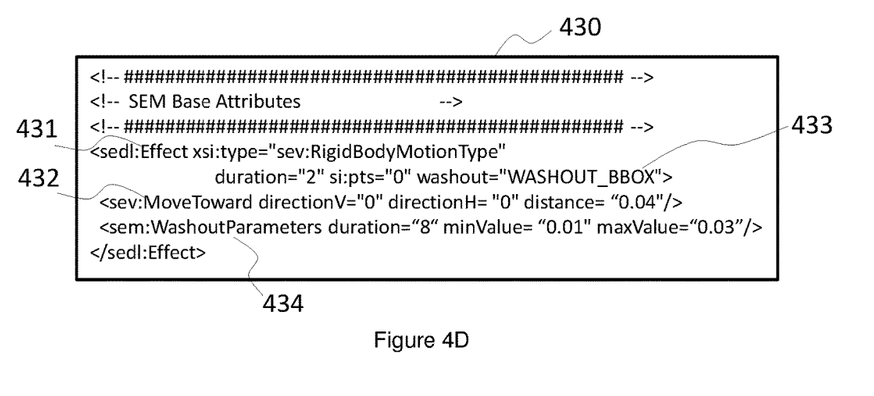
Figure 5A:
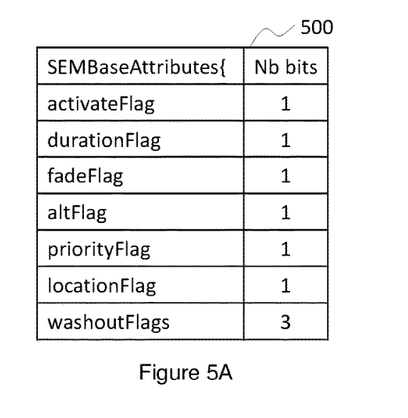
FIGS. 5A-5D illustrate tables corresponding to an example of implementation based on the MPEG-V standard.
Figure 5B:
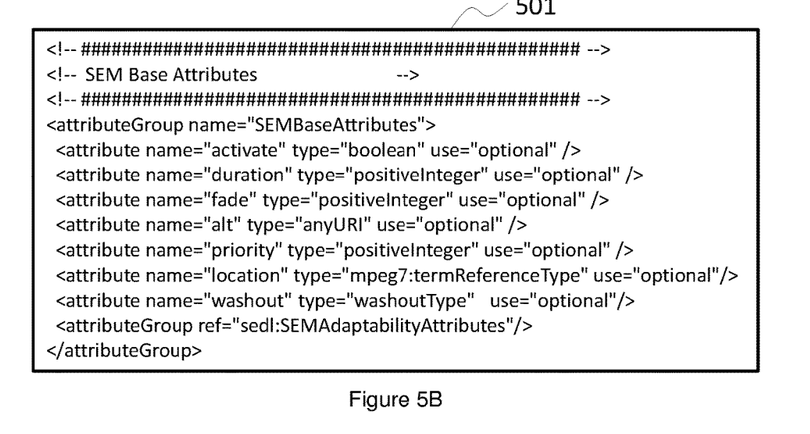
Figure 5C:
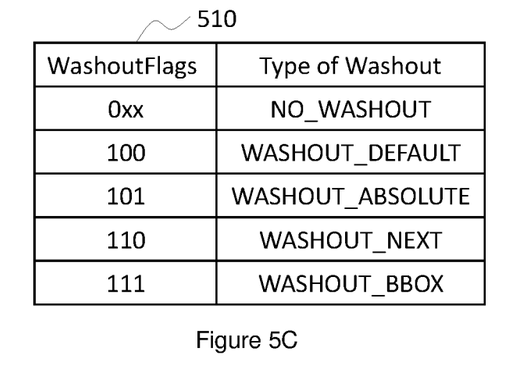
Figure 5D:
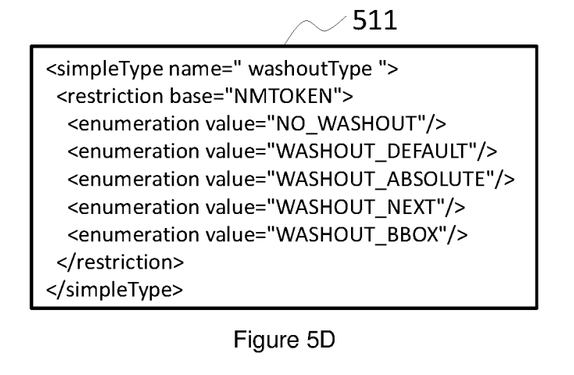

FIGS. 4A, 4B, 4C and 4D illustrate the definition of the effects as signalled according to the preferred embodiment in the HAV packets in xml format corresponding to an example of implementation based on the MPEG-V standard and resulting respectively to the movements illustrated in FIGS. 3A, 3B, 3C and 3D. This definition easily transposes to the bitstream version. In FIG. 4A, element 401 "sedI:Effect" defines the type of the effect. In the case of a haptic device, the effect is of type "sev:RigidBodyMotionType". Some of the effect parameters are directly given within the element 401, such as the duration of the effect, here fixed to 2 seconds. Other effect parameters are defined in the element 402, such as the instance of effect, here a translation movement indicated by the "MoveForward" element, and additional elements indicating the direction of movement towards the front (since both vertical and horizontal angles respectively defined by "directionV" and "directionH" parameters being null) of a distance of 5 centimeters since the "distance" field has for value "0.05" meters. The washout effect is signalled in the effect type definition, through the "washout" flag 403 that also defines the type of washout. The parameters of the washout are defined by a separate element and depend on the type of washout. In FIG. 4A, the washout type is WASHOUT_DEFAULT, and the duration of the washout is defined by element 404 since default zero position of the device will be used. In FIG. 4B, the washout type is WASHOUT_ABSOLUTE and in addition to the duration, the absolute position value needs to be given in 414 through the "value" field. In FIG. 4C, the washout type is WASHOUT_NEXT and in addition to the duration, the parameters of the next RigidBodyMotionType effect needs to be given in 424. This is done using similar elements than for an effect parameters, here the "duration", "distance", "directionV" and "directionH" parameters. In FIG. 4D, the washout type is WASHOUT_BBOX and in addition to the duration, the minimal and maximal values of the range needs to be given in 434, through the "minValue" and "maxValue" elements. Such tables are carried in haptic packets illustrated in FIG. 2A.

FIGS. 5A, 5B, 5C and 5D illustrate tables corresponding to an example of implementation based on the MPEG-V standard. In MPEG-V, the SEMBaseAttributes table defines attributes used to determine the parameters of the effect (such as the duration of the effect, an alternate effect, etc.). These attributes are used in the definition of an haptic effect, as illustrated in FIGS. 4A to 4D. To signal a washout effect to the HAV rendering device, a new set of flags named "washoutFlags" is defined. This new set of flags is illustrated according to a bitstream representation in the table 500 depicted in FIG. 5A and is also illustrated according to an xml representation in the table 501 depicted in FIG. 5B. When the first bit of this set of bits is positioned to true, the remaining bits defines the type of washout to be performed. This type is defined by the table 510 in FIG. 5C according to a bitstream representation and by the table 511 in FIG. 5D according to an xml representation. The "washoutFlags" information is inserted in the definition of an effect, as illustrated in FIGS. 4A to 4D. Such table is carried in the haptic packets illustrated in FIG. 2A.

Figure 6:
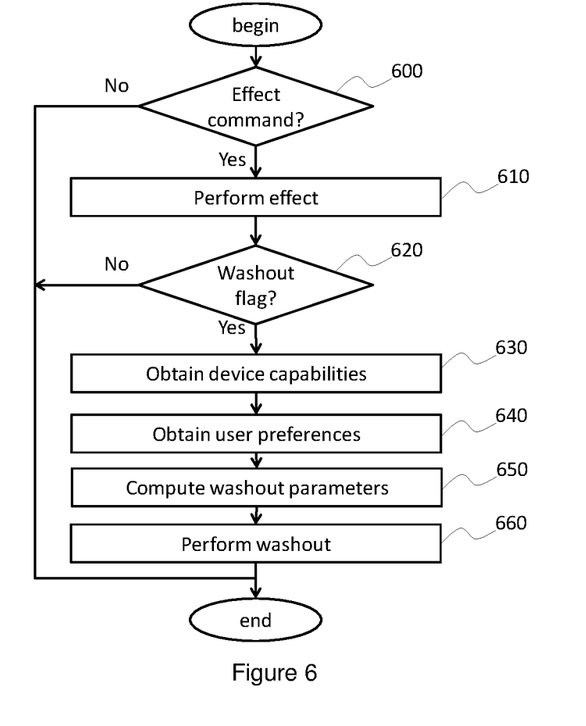
FIG. 6 shows the process occurring on a HAV rendering device when a haptic packet is obtained.

FIG. 6 shows a method performed by a HAV rendering device 100 when a haptic packet is obtained. The device 100 checks, in step 600, if the packet corresponds to a haptic effect. If it is the case, then the haptic effect is performed, in step 610, by the haptic actuator, through a haptic command provided by the processor through the haptic interface. It is then checked, in step 620, if the obtained haptic packet comprised a washout flag. If it is the case, then the device capabilities and user preferences are obtained, respectively in step 630 and 640. Then the device computes, in step 650, the washout command to be applied, depending on the different parameters obtained regarding the device capabilities and the user preferences. The command is provided to the haptic actuator through the haptic interface, so that the HAV rendering device 100 performs the washout, in step 660. Steps 630 and 640 are illustrated here as occurring after the effect execution. In practise, these steps can be executed at any time and even do not need to be executed for each new effect. In a typical implementation, step 630 related to the device capabilities is performed once at the initialisation of the device since the device capabilities are fixed and do not change during time.

The computation of the washout command in step 650 of FIG. 6A can be performed according to different implementations. In any case, the HAV rendering device tries to respect, when possible, the user preferences, particularly regarding the limits set by the user regarding the speed and accelerations of the haptic device. In case of WASHOUT_DEFAULT, the washout command will be set so that the device positions itself to the default zero value, as specified in the device preferences. In case of WASHOUT_ABSOLUTE, the washout command will be set so that the device positions itself at either the absolute position or the position as close as possible to the absolute position defined by the washout parameter carried in the haptic packet, according to the device capabilities. In case of WASHOUT_NEXT, the next movement is extracted from the washout parameter carried in the haptic packet and is added to the current position. If the resulting value is within the capabilities of the device, then no washout is needed. When it is not the case, the target position to be reached corresponds to the device capabilities minus the next movement value. If this is achievable respecting the vestibular threshold, the washout command will be set so that the device positions itself at this target position. If it is not possible to reach this target position, then the position as close as possible of this target position will be chosen, knowing that the next effect will not be fully rendered. In case of WASHOUT_BBOX, the bounding box values are extracted from the washout parameter carried in the haptic packet. If the average value of the bounding box upper and lower limits is achievable respecting the vestibular threshold, the washout command will be set so that the device positions itself at this target position. If it is not the case, the washout command will be set so that the device positions itself at the position as close as possible of this position.

In the case of WASHOUT_NEXT and WASHOUT_BBOX, the haptic rendering device has some freedom regarding the final position resulting from the washout effect. Simple strategies have been introduced above. More complex strategies are comprising the use of analytics over the past movements to determine some trends or patterns, allowing to better anticipate further movements and thus to position better the haptic rendering device during the washouts.

Figure 7:
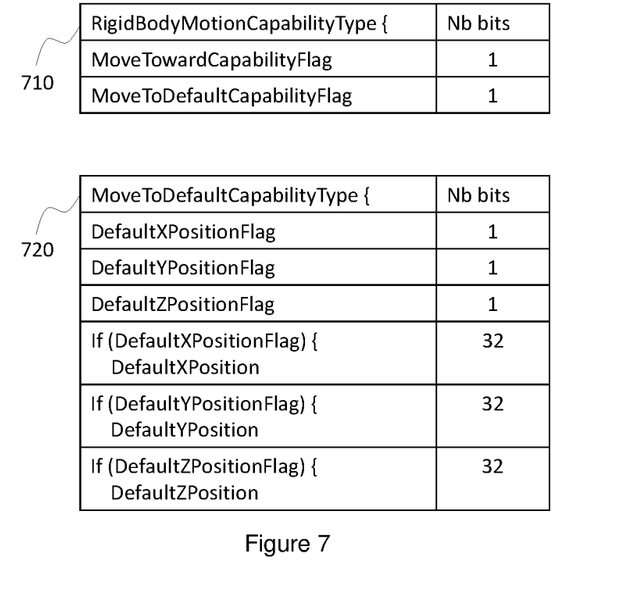
FIG. 7 illustrates the tables needed to define the device default values of a haptic device.

FIG. 7 illustrates the tables needed to define the device default values of a haptic device. In the "RigidBodyMotionCapabilityType" structure depicted by table 710 already defined in the MPEG-V standard, the "MoveToDefaultCapabilityFlag" is added in order to be able to define the default position values of the device. When this flag is active, a new "MoveToZeroCapabilityType" structure depicted by table 720 defines the default values for the 3-dimensional position. In the spirit of the MPEG-V standard, when flag "DefaultXPositionFlag" is positioned to "true", then the default value for the X axis is defined by the "DefaultXPosition" attribute. Similar flags and attributes are proposed for the other dimensions.

Figure 8:
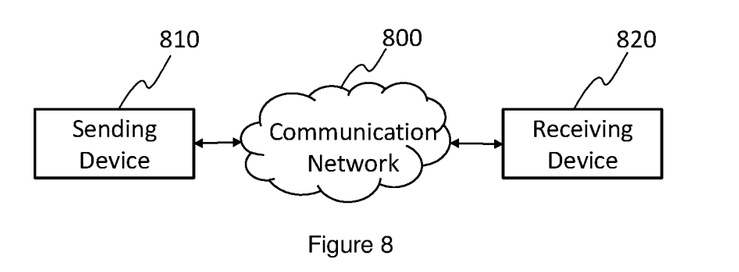
FIG. 8 illustrates the context of transmitting a haptic audiovisual content between two remote devices; a sending device and a receiving device of the type of device illustrated in FIG. 1, over a communication network.

FIG. 8 illustrates the context of transmitting a haptic audiovisual content between two remote devices; a sending device 810 and a receiving device 820, over a communication network 800. The device 810 is a conventional computing device, well known by the skilled in the art, that comprises at least a hardware processor configured to implement a method for encoding a stream. The device 820 is a device as illustrated in FIG. 1, that comprises at least a hardware processor configured to implement a method for decoding as described in relation with FIG. 6. In accordance with an example, the network 800 is a LAN or WLAN network, adapted to transmit HAV content from sending device 810 to at least one decoding device such as the device 820. A signal, intended to be transmitted by the device 810, carries a bitstream illustrated in FIG. 2A. The bitstream comprises an encoded haptic packet as explained before. This signal further comprises first and second information data as described with regard to FIG. 2B.

Figure 9:
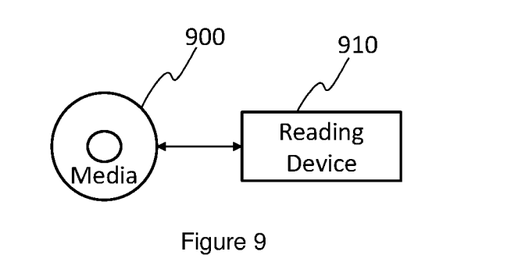
FIG. 9 illustrates the context of obtaining a haptic audiovisual content previously recorded on a storage element and read by a reading device.

FIG. 9 illustrates the context of obtaining a haptic audio-visual content previously recorded on a media storage element 900 and read by a reading device 910 of the type of the device illustrated in FIG. 1. The HAV content is stored on the media storage element 900 under the form of a signal carrying the bitstream illustrated in FIG. 2A and adapted to be read by the device 910 through an interface of the type of the interface 130 illustrated in FIG. 1 adapted to the particular media storage format. This signal further comprises first and second information data as described with regard to FIG. 2B. The device 910 comprises at least a processor of the type of the processor 110 illustrated in FIG. 1 configured to implement a method for reading the HAV content from the media storage element 900 and decoding it as described in relation with FIG. 6. Examples of media storage element 900 are optical discs such a digital versatile disc (DVD) or Blu-ray discs (BD), magnetic storage such as hard disk drive, memory-based storage such as solid state disc (SSD) or memory cartridges. Other types of storage can be used consistently with the spirit of the invention.

Figure 10:
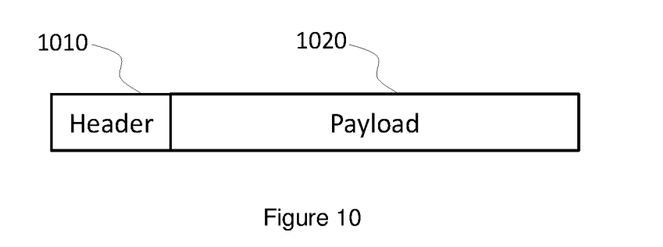
FIG. 10 shows an example of an embodiment of the syntax of a signal carrying the HAV content when the data are transmitted using a packet-based transmission protocol.

FIG. 10 shows an example of an embodiment of the syntax of a signal carrying the HAV content when the data are transmitted using a packet-based transmission protocol. Each transmitted packet P comprises a header 1010 and a payload 1020. Some bits of the header, for example, are dedicated to represent the first information representative of a washout effect while the payload 1020 preferably comprises an optional second information representative of the parameters required for the washout.

Although the description focused on movements in the case of haptic devices, the invention applies to other sensory environments, and more specifically to any haptic effect that has some inertia (often related to physical constraints) and a kind of default value that can be considered as a neutral position. It only requires adapting the washout parameters described in FIG. 5A to 5D to the parameters of the type of effect.

Temperature is another example of environmental parameter on which the same principle applies. In this context, the washout parameters need to be adapted to the "TemperatureType" instead of "RigidBodyMotionType" and therefore define either a "intensity-value" or a "intensity-range". However the overall principle of the disclosure completely applies. The one skilled in the art will understand the extension to the other effects for example as those described according to the MPEG-V specification.

As will be appreciated by one skilled in the art, aspects of the present principles can take the form of an entirely hardware embodiment, an entirely software embodiment (including firmware, resident software, micro-code and so forth), or an embodiment combining hardware and software aspects that can all generally be defined to herein as a "circuit", "module" or "system". Furthermore, aspects of the present principles can take the form of a computer readable storage medium. Any combination of one or more computer readable storage medium(s) can be utilized. It will be appreciated by those skilled in the art that the diagrams presented herein represent conceptual views of illustrative system components and/or circuitry embodying the principles of the present disclosure. Similarly, it will be appreciated that any flow charts, flow diagrams, state transition diagrams, pseudo code, and the like represent various processes which may be substantially represented in computer readable storage media and so executed by a computer or processor, whether or not such computer or processor is explicitly shown. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information there from. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

Each feature disclosed in the description and (where appropriate) the claims and drawings may be provided independently or in any appropriate combination. Features described as being implemented in hardware may also be implemented in software, and vice versa. Reference numerals appearing in the claims are by way of illustration only and shall have no limiting effect on the scope of the claims.

The invention claimed is:

1. A method for controlling rendering of a haptic effect, the method being implemented in a haptic rendering device and comprising:
    obtaining a signal comprising information representative of the haptic effect to be rendered, the information carrying at least a first information whose value is representative of a haptic washout effect to be performed after the haptic effect, said haptic washout effect being in opposition with the haptic effect;
    providing a first haptic command representative of the haptic effect to a haptic actuator to perform the haptic effect;
    computing a second haptic command representative of the haptic washout effect, the second haptic command being adapted to a haptic rendering according to device capabilities; and
    providing the second haptic command to the haptic actuator to perform the haptic washout effect.

2. The method of claim 1 where computing the second haptic command representative of the haptic washout effect is performed according to user preferences.

3. The method of claim 1 where the value of first information corresponds to a determined value representative of a haptic washout effect with absolute positioning, further comprising a second information representative of the parameters required for the haptic washout effect to be performed after the haptic effect and where the second information comprises an absolute value to be reached by the haptic washout effect.

4. The method of claim 1 where the value of first information corresponds to a determined value representative of a haptic washout effect with next effect information, further comprising a second information representative of the parameters required for the haptic washout effect and where this second information comprises information representative of a next effect to be performed.

5. The method of claim 1 where the value of first information corresponds to a determined value representative of a haptic washout effect with range positioning, further comprising the second information representative of the parameters required for the washout effect and where this second information comprises a minimal position value and a maximal position value defining a range of position values, to be respected by the haptic washout effect.

6. A data processing apparatus for controlling the rendering of a haptic effect, comprising:
   an input interface configured to obtain a signal comprising information whose value is representative of an haptic effect to be rendered characterized in that the signal carries at least a first information representative of a haptic washout effect to be performed after the haptic effect, said haptic washout effect being in opposition with the haptic effect;
   a haptic interface configured to:
   provide a first haptic command representative of the haptic effect to a haptic actuator to perform the haptic effect;
   obtain device capabilities from the haptic actuator;
   compute a second haptic command representative of the haptic washout effect, the second haptic command being adapted to a haptic rendering according to device capabilities; and
   provide the second haptic command to the haptic actuator to perform the haptic washout effect a memory configured to provide at least the haptic user preferences; and
   a processor configured to compute the haptic washout effect, according to at least one of the device capabilities and user preferences.

7. The data processing apparatus according to claim 6 wherein the processor is further configured to detect that analyze the value of first information and when the value of the first information corresponds to a determined value representative of a haptic washout effect with absolute positioning:
   obtain from the signal a second information representative of the parameters required for the haptic washout effect to be performed and where the second information comprises an absolute value to be reached by the washout operation;
   compute the haptic washout effect, according to the absolute value to be reached and at least one of the device capabilities and user preferences.

8. The data processing apparatus according to claim 6 wherein the processor is further configured to analyze the value of first information and when the value of the first information corresponds to a determined value representative of a haptic washout effect with information representative of the next effect to be performed:
   obtain from the signal a second information representative of the parameters required for the haptic washout effect to be performed and where this, the second information comprises information representative of the next effect to be performed;
   compute the haptic washout effect, according to the information representative of the next effect and at least one of the device capabilities and user preferences.

9. The data processing apparatus according to claim 6 wherein the processor is further configured to analyze the value of first information and when the value of the first information corresponds to a determined value representative of a haptic washout effect with range positioning and in this case:
   obtain from the signal a second information representative of the parameters required for the haptic washout effect to be performed and where the second information comprises a minimal position value and a maximal position value defining a range of position values, any one of which should be respected by the haptic washout effect;
   compute the haptic washout effect, according to the range of position values and at least one of the device capabilities and user preferences.

10. The data processing apparatus according to claim 6, wherein the signal comprising information representative of a haptic effect to be rendered is received from a sending device through a communication network.

11. The data processing apparatus according to claim 6, wherein the signal comprising information representative of a haptic effect to be rendered is obtained from a media storage element.

12. A computer program comprising program code instructions executable by a processor for implementing the steps of the method according to claim 1.

13. A computer program product which is stored on a non-transitory computer readable medium and comprises program code instructions executable by a processor for implementing the steps of the method according to claim 1.

* * * * *

UNITED STATES PATENT AND TRADEMARK OFFICE
CERTIFICATE OF CORRECTION

PATENT NO. : 10,096,213 B2
APPLICATION NO. : 15/212253
DATED : October 9, 2018
INVENTOR(S) : Didier Doyen et al.

It is certified that error appears in the above-identified patent and that said Letters Patent is hereby corrected as shown below:

In the Claims

1. At Column 13, Line 37, Claim 7, replace "to detect that" with -- to --

2. At Column 14, Line 9, Claim 8, replace "where this," with -- where --

Signed and Sealed this
Nineteenth Day of November, 2024

Katherine Kelly Vidal
*Director of the United States Patent and Trademark Office*